(12) United States Patent
Bu

(10) Patent No.: US 9,436,028 B2
(45) Date of Patent: Sep. 6, 2016

(54) LIQUID CRYSTAL DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Zhanchang Bu, Beijing (CN)

(73) Assignee: BOE Technology Group Co., Ltd, Beijing (CN)

( * ) Notice: Subject to any disclaimer, the term of this patent is extended or adjusted under 35 U.S.C. 154(b) by 12 days.

(21) Appl. No.: 14/428,529

(22) PCT Filed: Apr. 28, 2013

(86) PCT No.: PCT/CN2013/074968
§ 371 (c)(1),
(2) Date: Mar. 16, 2015

(87) PCT Pub. No.: WO2014/153803
PCT Pub. Date: Oct. 2, 2014

(65) Prior Publication Data
US 2015/0248036 A1 Sep. 3, 2015

(30) Foreign Application Priority Data
Mar. 27, 2013 (CN) .......................... 2013 1 0101368

(51) Int. Cl.
*G02F 1/1333* (2006.01)
(52) U.S. Cl.
CPC .................. *G02F 1/133308* (2013.01); *G02F 2001/13332* (2013.01); *G02F 2201/503* (2013.01); *G02F 2201/54* (2013.01)
(58) Field of Classification Search
None
See application file for complete search history.

(56) References Cited

U.S. PATENT DOCUMENTS

| 2006/0207145 | A1* | 9/2006 | Kim | G02F 1/133308 40/700 |
| 2008/0093428 | A1* | 4/2008 | Kao | B65D 7/42 229/101 |
| 2009/0135331 | A1* | 5/2009 | Kawase | G02F 1/133605 349/58 |
| 2013/0088820 | A1* | 4/2013 | Kuroda | H05K 5/0017 361/679.01 |
| 2014/0192292 | A1* | 7/2014 | Li | G02B 6/0088 349/65 |
| 2015/0002785 | A1* | 1/2015 | Huang | G02B 6/0066 349/65 |

FOREIGN PATENT DOCUMENTS

| CN | 201322832Y Y | 10/2009 |
| CN | 102654671 A | 9/2012 |

(Continued)

OTHER PUBLICATIONS

Oct. 10, 2013—(WO) ISR—App. No. PCT/CN13/074968—with Eng Tran of Written Opinion.

*Primary Examiner* — Richard Kim
(74) *Attorney, Agent, or Firm* — Banner & Witcoff, Ltd.

(57) ABSTRACT

A liquid crystal display, comprising a back light module, a metal side frame, and a liquid crystal display panel disposed between the back light module and the metal side frame, wherein the metal side frame comprises a first magnet, the back light module comprises a second magnet, at least a portion of the first magnet and the second magnet are oppositely disposed, and each magnet is provided with an identical kind of magnetic pole on the side facing to the liquid crystal display panel. The liquid crystal display retains the gap between the liquid crystal display panel and the metal side frame, thereby preventing the problem of light leakage in a 0 grayscale image.

20 Claims, 4 Drawing Sheets

(56) References Cited

FOREIGN PATENT DOCUMENTS

| CN | 203133432 U | 8/2013 |
| KR | 20070057332 A | 6/2007 |
| WO | 2013002117 A1 | 1/2013 |

* cited by examiner

LIQUID CRYSTAL DISPLAY DEVICE

The application is a U.S. National Phase Entry of International Application No. PCT/CN2013/074968 filed on Apr. 28, 2013, designating the United States of America and claiming priority to Chinese Patent Application No. 201310101368.2 filed on Mar. 27, 2013. The present application claims priority to and the benefit of the above-identified applications and the above-identified applications are incorporated by reference herein in their entirety.

TECHNICAL FILED

The embodiments of present disclosure relate to a liquid crystal display device.

BACKGROUND

At present, liquid crystal display technologies are mainly divided into several kinds of technologies such as twisted nematic (TN), vertical alignment (VA), in-plane switching (IPS) and advanced-super dimensional switching (ADS). A liquid crystal display device usually comprises a metal side frame, a liquid crystal display panel, a rubber frame, an optical film, a light guide plate, a circuit board and the like. The technical mechanisms of the IPS and the ADS liquid crystal display are basically same. However, the liquid crystal display devices adopting these two kinds of technologies usually suffer the light leakage problem due to the technologies themselves. Moreover, at present, the only way to solve this problem is to change on mechanical structure. A gap is provided between the liquid crystal display panel and the metal side frame to avoid the metal side frame contacting and squeezing the liquid crystal display panel itself, as shown in FIG. 1.

However, there are problems by provision of the gap, because it is impossible to achieve one hundred percent flattening, due to the producing process itself, for the metal side frame and the rear panel, and generally speaking, there is a warpage about 0.6 mm. If the deformation occurring after assemble is also considered, it is inevitable that the metal side frame contact and squeeze the liquid crystal panel. Finally, the liquid crystal molecules are abnormally deflected because of the external force, which leads to the problem of light leakage in a 0 grayscale image.

In another aspect, the liquid crystal display device adopting the IPS or ADS technologies, the problem of light leakage in a 0 grayscale image must be considered during the structure design. The whole display device will be thicker about 0.5 mm to 1 mm when a gap is provided between the liquid crystal display panel and the metal side frame, which leads to that super thinness of the liquid crystal panel adopting this technologies cannot be achieved. Therefore, in view of super thinness these products cannot be competitive with the TN and VA product. It is also substantial to decrease the thickness by about 0.5 mm to 1 mm in MNT products.

SUMMARY

The embodiments of present disclosure provide a liquid crystal display device which can retain a gap disposed between the liquid crystal display panel and the metal side frame to avoid the problem of light leakage in a 0 grayscale image.

The embodiments of present disclosure provide a liquid crystal display device, comprising a backlight module, a metal side frame, and a liquid crystal display panel disposed between the backlight module and the metal side frame; wherein the metal side frame comprises a first magnet, the backlight module comprises a second magnet, at least a portion of the first magnet and the second magnet are oppositely disposed, and each magnet is provided with an identical kind of magnetic pole on the side facing to the liquid crystal display panel.

For example, a first magnet is disposed on the metal side frame. For example, the first magnet is a ductile material. For example, the first magnet is a rubber magnet.

For example, the metal side frame becomes a first magnet having magnetic via a magnetization process.

For example, the backlight module comprises a rubber frame, a light guide plate and a rear panel.

For example, the second magnet having magnetic is disposed on any one of the rubber frame, the light guide plate and the rear panel. For example, the second magnet is a ductile material. For example, the second magnet is a rubber magnet.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

1: metal side frame; 2: liquid crystal display panel; 3: rubber frame; 4: optical film; 5: light guide plate; 6: rear panel; 7: circuit board; 8: backlight module; 9: first magnet; 10: second magnet.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 2:
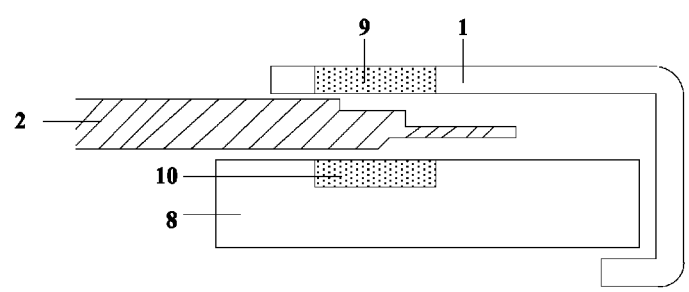
FIG. 2 is a schematic view showing a liquid crystal display device in an embodiment of present disclosure.

FIG. 2 is a schematic view showing a liquid crystal display device in an embodiment of present disclosure. The liquid crystal display device comprises a backlight module 8, a metal side frame 1, and a liquid crystal display panel 2 disposed between the backlight module 8 and the metal side frame 1. The metal side frame 1 comprises a first magnet 9, the backlight module 8 comprises a second magnet 10, the first magnet 9 and the second magnet 10 are provided on the two sides of the liquid crystal display panel respectively, and at least a portion of the first magnet 9 and the second magnet 10 are oppositely disposed, and the two magnets are provided with an identical kind of magnetic pole on the side facing to the liquid crystal display panel 2.

Because at least a portion of the first magnet 9 and the second magnet 10 are oppositely disposed and the two magnets are provided with an identical kind of magnetic pole on the side facing to the liquid crystal display panel; the identical magnetic poles repel each other. The metal side frame 1 in FIG. 2 receives an upward acting force, with the action of the acting force, a certain space (gap) is retained between the metal side frame 1 and the liquid crystal display panel 2, and the space makes the metal side frame 1 not touch the surface of the liquid crystal display panel 2, so the problem of light leakage in a 0 grayscale image of the IPS and ADS display panel can be solved. However, the present disclosure is not limited to apply to the IPS and ADS display panel.

For example, a first magnet 9 is disposed on the metal side frame 1, or the metal side frame 1 becomes a first magnet 9 via a magnetization process, and in this case, the metal side frame 1 is prepared by a metal material which can be magnetized.

For example, the first magnet 9 provided selects a ductile material. Furthermore, for example, the ductile material is a rubber magnet. When the rubber magnet is used to replace the silicone tape in an existing display device, as shown in FIG. 2, the damage of the liquid crystal display panel 2 caused by the vibration can be prevented. In addition, the elasticity of the rubber magnet is good, the rubber magnet can be produced in any shape according to actually need to provide on the metal side frame.

Figure 3:
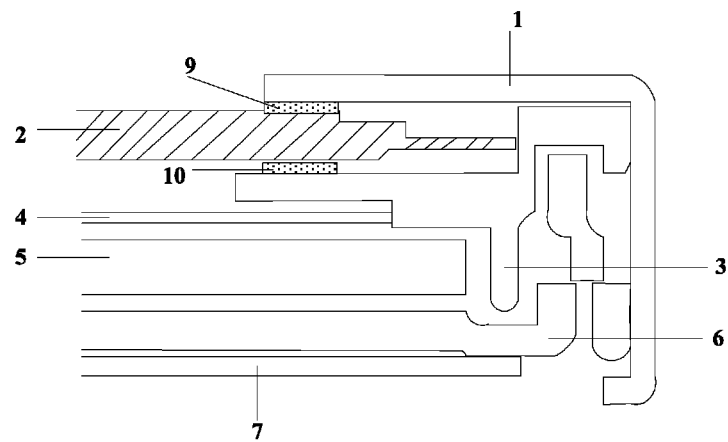
FIG. 3 is a schematic view showing a specific application of a liquid crystal display device in an embodiment of present disclosure.

In the liquid crystal display device in an embodiment of present disclosure, as shown in FIG. 3, the backlight module 8 may comprise a rubber frame 3, a light guide plate 5 and a rear panel 6.

Therefore, the second magnet 10 of the backlight module 8 may be disposed on any one of the components such as the rubber frame 3, the light guide plate 5 and the rear panel 6.

With respect to the second magnet 10 which is magnetic and disposed on any one of the components such as the rubber frame 3, the light guide plate 5 and the rear panel 6, for example, the second magnet 10 is a ductile material. Furthermore, the ductile material, for example, may be a rubber magnet as well.

An optical film 4 may be further disposed on the light-out surface of the light guide plate 5, the optical film 4 may be a diffuser film, an anti-reflection film, a prism film and the like or any combination thereof.

Figure 1:
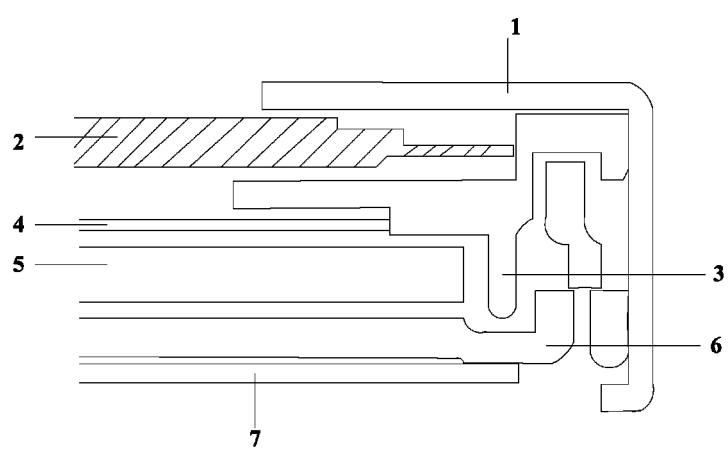
FIG. 1 is a schematic view showing a liquid crystal display device.

In one embodiment of present disclosure, as shown in FIG. 3, the first magnet 9 and the second magnet 10 are both rubber magnets, and the rubber magnets that are magnetic are used to substitute for the silicone tape in an existing display device as shown in FIG. 1. That is, a first rubber magnet 9 that is magnetic is bonded to the lower surface of the metal side frame 1, and a second rubber magnet 10 having an identical kind of magnetic pole with the first rubber magnet 9 is bonded to the upper surface of the rubber frame 3, and at least a portion of the first rubber magnet 9 and the second rubber magnet 10 are oppositely disposed, and the magnets are provided with an identical kind of magnetic pole on the side facing to the liquid crystal display panel 2.

Figure 4:
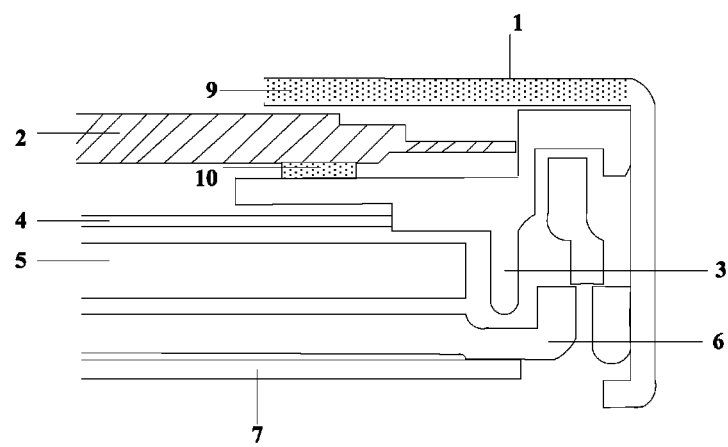
FIG. 4 is a schematic view showing another specific application of a liquid crystal display device in an embodiment of present disclosure.
Figure 5:
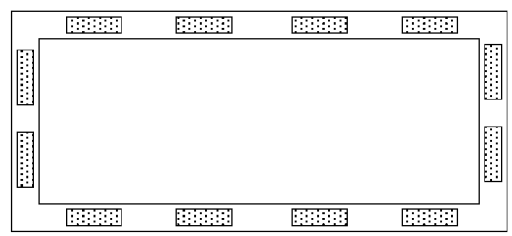
FIG. 5 is a schematic view showing provision of a magnetic material in an embodiment of present disclosure.
Figure 6:
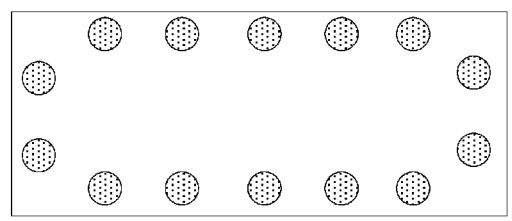
FIG. 6 is a schematic view showing provision of a magnetic material in another embodiment of present disclosure.

In another embodiment of present disclosure, as shown in FIG. 4, the metal side frame 1 is converted to be a first magnet 9 that is magnetic via a magnetization process. A second magnet 10 having an identical kind of magnetic pole with the first magnet 9 is disposed on the upper surface of the rubber frame 3. The second magnet 10 is a rubber magnet. The amount of the rubber magnets disposed on the rubber frame 3 can be adjusted according to actually needs, and the rubber magnets disposed may be in any shape, for example, in a rectangular and a circular shape as shown in FIG. 5 and FIG. 6.

Figure 7:
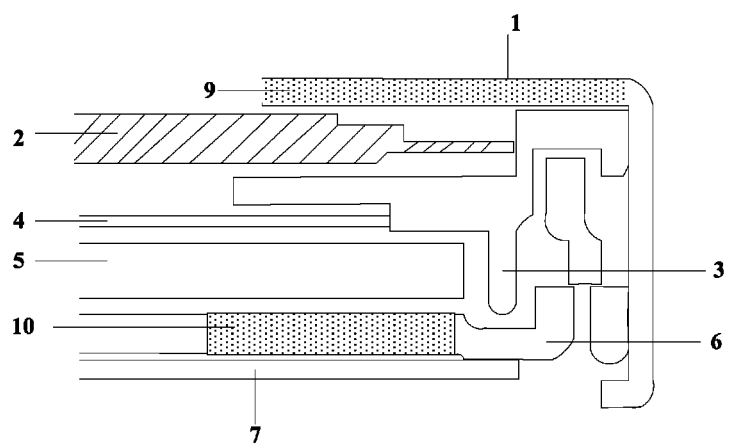
FIG. 7 is a schematic view showing a third specific application of a liquid crystal display device in an embodiment of present disclosure.

In another embodiment of present disclosure, as shown in FIG. 7, the metal side frame 1 is converted to be a first magnet 9 that is magnetic via a magnetization process. Second magnets 10 having an identical kind of magnetic pole with the first magnet 9 are mixed into the rear panel 6. The second magnets 10 are magnets. The amount of the magnets mixed in the rear panel 6 can be adjusted according to actually needs, and the mixed magnets may be in any shape.

Figure 8:
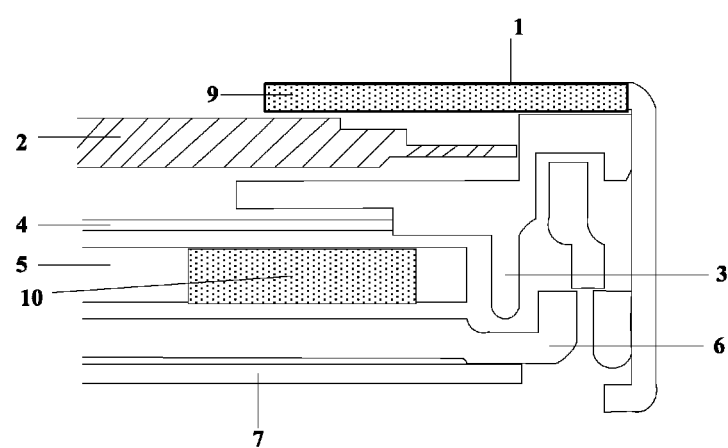
FIG. 8 is a schematic view showing a fourth specific application of a liquid crystal display device in an embodiment of present disclosure.

In the fourth embodiment of present disclosure, as shown in FIG. 8, the metal side frame 1 becomes a first magnet 9 that is magnetic via a magnetization process. Second magnets 10 having an identical kind of magnetic pole with the first magnet 9 are mixed into the light guide plate 5. The second magnets 10 are magnets. The amount of the magnets mixed in the light guide plate 5 can be adjusted according to actually needs, and the mixed magnets may be in any shape.

In the above embodiments, the provision method of the first magnet 9 or the second magnet 10 comprises several methods as follows: bonding magnetic materials, magnetizing the components themselves, mixing magnetic materials and the like.

The liquid crystal display device in embodiments of present disclosure comprises a backlight module 8, a metal side frame 1, and a liquid crystal display panel disposed between the backlight module 8 and the metal side frame 1. The metal side frame 1 comprises a first magnet 9, the backlight module 8 comprises a second magnet 10, at least a portion of the first magnet 9 and the second magnet 10 are oppositely disposed, and the magnets are provided with an identical kind of magnetic pole on the side facing to the liquid crystal display panel. A gap disposed between the metal side frame 1 and the liquid crystal display panel 2 is retained using the mechanism that identical poles of the magnets repel each other to make the metal side frame 1 not touch the surface of the liquid crystal display panel 2. Therefore, the problem of light leakage in a 0 grayscale image of the IPS and ADS display panel can be solved. However, the present disclosure is not limited to apply to the IPS and ADS display panel.

A first magnet 9 is disposed on the metal side frame 1, or the metal side frame 1 becomes a first magnet 9 that is magnetic via a magnetization process. For example, the first magnet 9 may comprise a ductile material. Furthermore, for example, the ductile material is a rubber magnet.

The backlight module 8 comprises a rubber frame 3, a light guide plate 5 and a rear panel 6. The second magnet 10 having an identical kind of magnetic pole with the first rubber magnet 9 may be disposed on any one of the components such as the rubber frame 3, the light guide plate 5 and the rear panel 6. For example, the second magnet 10 comprises a ductile material. Furthermore, for example, the ductile material is a rubber magnet.

Whether the first magnet 9 or the second magnet 10, the amount of the magnets can be adjusted according to actually needs, and the magnets disposed may be in any shape.

What are described above is related to the illustrative embodiments of the disclosure only and not limitative to the scope of the disclosure; the scopes of the disclosure are defined by the accompanying claims.

What is claimed is:

1. A liquid crystal display device, comprising a backlight module, a metal side frame, and a liquid crystal display panel disposed between the backlight module and the metal side frame;
    wherein the metal side frame comprises a first magnet, the backlight module comprises a second magnet, at least a portion of the first magnet and the second magnet are oppositely disposed, and the first magnet and the second magnet are provided with an identical kind of magnetic pole on a side facing to the liquid crystal display panel, and a repulsive force is formed between the first magnet and the second magnet.

2. The liquid crystal display device according to claim 1, wherein the first magnet is disposed on the metal side frame.

3. The liquid crystal display device according to claim 2, wherein the first magnet comprises a ductile material.

4. The liquid crystal display device according to claim 2, wherein the first magnet comprises a rubber magnet.

5. The liquid crystal display device according to claim 2, wherein the backlight module comprises a rubber frame, a light guide plate and a rear panel.

6. The liquid crystal display device according to claim 5, wherein the second magnet that is magnetic is disposed on any one of the rubber frame, the light guide plate and the rear panel.

7. The liquid crystal display device according to claim 6, wherein the second magnet comprises a ductile material.

8. The liquid crystal display device according to claim 6, wherein the second magnet comprises a rubber magnet.

9. The liquid crystal display device according to claim 1, wherein the first magnet comprises a ductile material.

10. The liquid crystal display device according to claim 9, wherein the backlight module comprises a rubber frame, a light guide plate and a rear panel.

11. The liquid crystal display device according to claim 10, wherein the second magnet that is magnetic is disposed on any one of the rubber frame, the light guide plate and the rear panel.

12. The liquid crystal display device according to claim 11, wherein the second magnet comprises a ductile material.

13. The liquid crystal display device according to claim 11, wherein the second magnet comprises a rubber magnet.

14. The liquid crystal display device according to claim 1, wherein the first magnet comprises a rubber magnet.

15. The liquid crystal display device according to claim 1, wherein the metal side frame is converted to the first magnet that is magnetic via a magnetization process.

16. The liquid crystal display device according to claim 1, wherein the backlight module comprises a rubber frame, a light guide plate and a rear panel.

17. The liquid crystal display device according to claim 16, wherein the second magnet that is magnetic is disposed on any one of the rubber frame, the light guide plate and the rear panel.

18. The liquid crystal display device according to claim 17, wherein the second magnet comprises a ductile material.

19. The liquid crystal display device according to claim 17, wherein the second magnet comprises a rubber magnet.

20. The liquid crystal display device according to claim 1, wherein a gap is retained between the metal side frame and the liquid crystal display panel, and the gap is configured to let the metal side frame not touch a surface of the liquid crystal display panel.

* * * * *